(12) United States Patent
Kumar et al.

(10) Patent No.: US 11,108,703 B1
(45) Date of Patent: Aug. 31, 2021

(54) CONSISTENT RESOURCE VISIBILITY DURING INTER-CELLULAR MIGRATIONS USING TARGETED PAIRWISE SCATTER-GATHER TECHNIQUES

(71) Applicant: Amazon Technologies, Inc., Seattle, WA (US)

(72) Inventors: Sandeep Kumar, Sammamish, WA (US); Sudheer Kumar Sanapati, Seattle, WA (US); Edwin Ma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/809,897

(22) Filed: Mar. 5, 2020

(51) Int. Cl.
*G06F 15/173* (2006.01)
*H04L 12/911* (2013.01)
*G06F 16/953* (2019.01)
*H04L 29/08* (2006.01)

(52) U.S. Cl.
CPC .......... *H04L 47/827* (2013.01); *G06F 16/953* (2019.01); *H04L 67/02* (2013.01); *H04L 67/148* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 10,719,503 B1* | 7/2020 | Bar Oz | G06F 16/215 |
| 2011/0321148 A1* | 12/2011 | Gluck | H04L 63/102 |
| | | | 726/9 |
| 2016/0103914 A1* | 4/2016 | Im | G06F 16/2455 |
| | | | 707/770 |
| 2016/0337320 A1* | 11/2016 | Mason | G06F 16/9566 |
| 2017/0094032 A1* | 3/2017 | James | G06F 16/9566 |
| 2018/0262510 A1* | 9/2018 | Su | G06F 21/6218 |
| 2019/0179805 A1* | 6/2019 | Prahlad | G06F 16/1827 |
| 2020/0409919 A1* | 12/2020 | Zhang | G06N 5/022 |

* cited by examiner

*Primary Examiner* — Phyllis A Book
(74) *Attorney, Agent, or Firm* — Nicholson DeVos Webster & Elliott LLP

(57) ABSTRACT

Techniques for consistent resource visibility during inter-cellular migrations using targeted pairwise scatter-gather techniques are described. For a paginated request to describe resources existing in cells of a provider network that match one or more criteria, a set of candidate cells having, or likely to have, resources of interest that match the one or more criteria are identified. Pairs of the candidate cells that are determined to be involved in a migration are jointly queried according to a scatter-gather type approach and aggregated via a union technique to remove duplicate resource entries. Other cells not involved in a resource migration are independently queried.

20 Claims, 8 Drawing Sheets

CONSISTENT RESOURCE VISIBILITY DURING INTER-CELLULAR MIGRATIONS USING TARGETED PAIRWISE SCATTER-GATHER TECHNIQUES

BACKGROUND

Many entities seeking to reduce the expense and overhead associated with maintaining their own computing resources, such as data storage and computing capacity, have turned to solutions offered by computing resource service provider networks. Such distributed computing systems provide customers with the ability to utilize a variety of computing resources, such as via generating and/or using virtual devices, such as block storage devices, as well as the ability to manipulate incremental backups and state snapshots thereof. Such snapshots can, in some implementations, also become the basis of one or more new block storage devices, which in turn can also have snapshots generated therefrom. As the number of snapshots and volumes generated in the distributed computing system grows larger, the computing resources required to service related activity may also become quite large, and in some cases, unevenly distributed (relative to the activity and/or costs associated with a given snapshot or volume) across the resources of the computing resource service provider.

In many cases, services offered in a region of a provider network are offered as a logically single instance that is "scaled up" to accommodate increases in demand by adding capacity at multiple layers of the service and by making architectural changes where needed. Such a scale-up approach may present significant disadvantages. For example, one potential downfall of "scaling up" involves the service having a large "blast radius" in that a single operational mistake, infrastructure failure, or software bug can affect, degrade, or crash an entire region of the provider network. Moreover, scaled-up services may also be too big to test, as testing them to their scale failure point is impractical and often not viable. Finally, many distributed system architectures have non-linear scale factors, which become a problem with systems designed to scale up.

In contrast, services may also be "scaled out" to accommodate growth by increasing the number of system components (e.g., databases, servers, subsystems, etc.) and dividing the workload such that the load on any component stays bounded over time despite the overall increase in workload. This task of dividing the workload can make scaling out more challenging than scaling up, particularly for stateful systems, but has many benefits, such as workload isolation to reduce the impact of failures, components that can be set to have a "maximal size" to reduce the risk from non-linear scaling factors and/or hidden contention points, systems that can be effectively stress tested, etc.

BRIEF DESCRIPTION OF DRAWINGS

Various embodiments in accordance with the present disclosure will be described with reference to the following drawings.

DETAILED DESCRIPTION

The present disclosure relates to methods, apparatus, systems, and non-transitory computer-readable storage media for consistent resource visibility during inter-cellular migrations using targeted pairwise scatter-gather techniques. According to some embodiments, resources implemented across a cell-based service of a provider network can be consistently presented to users despite ones of the resources being migrated between cells. In some embodiments, upon receipt of a request to describe resources matching a set of one or more criteria (e.g., indicating a type of resource, indicating a user or account that the resource is associated with, etc.), a thin routing layer of the service identifies candidate cells likely to have resources of interest—e.g., a set of resources matching the set of criteria—and identifies whether ones of the candidate cells are involved in a migration. To obtain data for the request, the thin routing layer can jointly query pairs of cells involved in migrations according to a scatter-gather technique and aggregate their responses to remove duplicate entries. The thin routing layer can also individually query other cells not involved in migrations, receive query responses from these cells providing resource data, and directly return the resource data. Accordingly, embodiments can enjoy the numerous benefits provided by cell-based architectures, such as comparative ease of scalability, without the problematic resource visibility inconsistencies resulting from migrations when typical querying techniques are employed.

Figure 1:
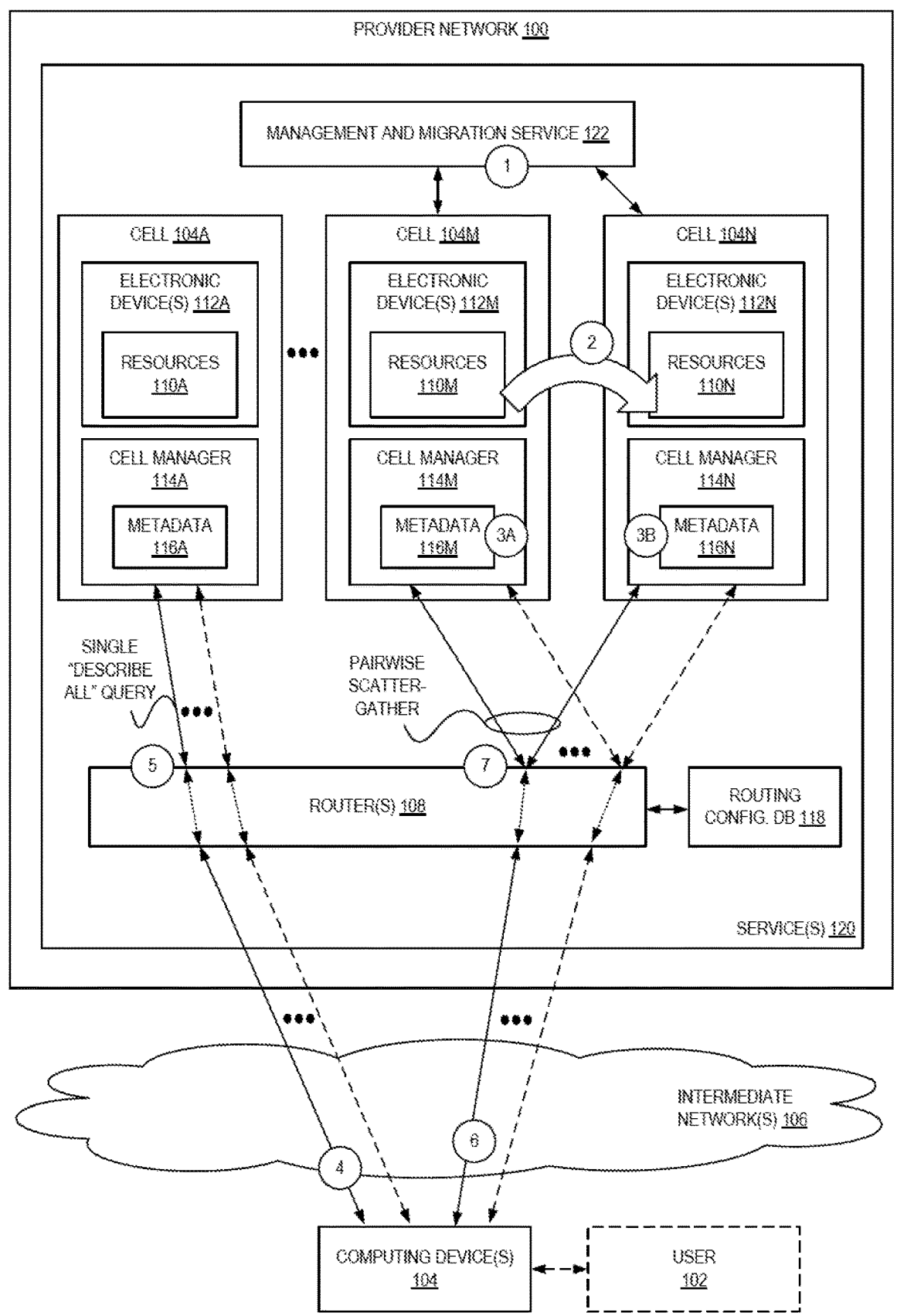
FIG. 1 is a diagram illustrating an environment for consistent resource visibility during inter-cellular migrations using targeted pairwise scatter-gather techniques according to some embodiments.

FIG. 1 is a diagram illustrating an environment for consistent resource visibility during inter-cellular migrations using targeted pairwise scatter-gather techniques according to some embodiments. In FIG. 1, one or more services 120 of a provider network 100 utilize a cell-based architecture in which resources 110A-110N are partitioned across multiple cells 104A-104N. The services 120, and/or subcomponents thereof, may be implemented using hardware, software, or a combination thereof, to provide users computing-related services. As an example, the service may be an elastic block store service (referred to in various implementations as a cloud disks service, a managed disk service, a storage area network service, a persistent disk service, or a block volumes service), or a portion of that service. As another example, the service may be an elastic compute cloud service (referred to in various implementations as an elastic compute service, a virtual machines service, a computing cloud service, a compute engine, or a cloud compute service), or a portion of that service. As another example, the service may be a simple storage service (referred to in various embodiments as an object storage service, blob storage service, cloud object storage service, or cloud storage service), or a portion of that service.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network). In some embodiments, an AZ may be further split into multiple cells as described herein.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM may be provided with one or more IP addresses in the overlay network, and the VMM on a host may be aware of the IP addresses of the virtual machines on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

As indicated above, rather than building out a service 120 as a single-image system, embodiments utilize a different approach in which services are broken down internally into cells 104A-104N and "thin" routing layers (e.g., implemented using router(s) 108) used to route traffic to the "correct" cells. Accordingly, a "cell" may be viewed as a small, independent part of a service having a set of resources 110A-110N that can be deterministically located in that cell. Thus, a cell is a scaled down unit of a service 120 that can independently represent a set of resources 110A-110M "assigned" to it or otherwise "governed" by it. Cells can thus enable provider networks to change their approach from "scaling up" to "scaling out"; being a complete independent instance of the service and possibly having a fixed maximum size, provider networks can grow services by adding more cells without changing the customer experience for the services.

The resources 110A-110M may be any of a variety of types of electronic computing type resources, ranging from storage resources like volumes, snapshots, or files, to other types of resources such as compute instances (e.g., VMs or containers), message queues, serverless on-demand functions, directories, code repositories, monitoring systems, other applications, networking structures such as subnets, etc.

In some embodiments, resources 110A-110N are associated with cells 104A-104N based on resource identifiers (also referred to herein as "partition keys"). For example, a resource may have a resource identifier associated therewith, and this resource identifier may be used, e.g., by a router 108 of a thin routing layer, to determine which cell is associated with that resource. As a simple example, a resource identifier range could include IDs of 1-100, where resource identifiers 1-25 are associated with a first cell, resource identifiers 26-50 are associated with a second cell, resource identifiers 51-75 are associated with a third cell, and resource identifiers 76-100 are associated with a fourth cell. In this manner, a request involving a particular resource can be "mapped" to the cell responsible for the resource by a router 108 using one of various techniques.

Various "best" approaches to implementing cells may depend on characteristics of the particular involved service. For example, the partition key (on what dimension are cells divided), partition mapping algorithm (how partition keys are mapped to cells), and the design of the "thin" routing layer can be customized based on the service.

Partition keys may be chosen to match the "grain" of the service that reflects the natural way(s) that a service's workload can be subdivided with minimal cross-grain interactions. A good partition key is one that is easily accessible in most API calls, either as direct parameter or a direct transformation of a parameter. Another consideration in selecting a partition key is the maximum cell size requirement; using a "customer account identifier" may be a reasonable candidate partition key for some services, but this may not be helpful for services in which certain customers may be "very" large and thus overwhelm a cell.

There are a variety of partitioning algorithms that can be flexibly used to map keys to cells. Regardless of algorithm, embodiments should utilize a mechanism to serve or distribute any state used by these algorithms, and gracefully handle migration when cells are added and removed. For example, embodiments could utilize one or more of a naïve modulo mapping approach that uses modular arithmetic to map keys to cells, typically on a cryptographic hash of the key; a consistent hashing approach from a family of algorithms (e.g., ring consistent hashing, jump consistent hashing, multi-probe consistent hashing, etc.) that map keys to buckets (e.g., cells or groups of cells) with a small amount of fairly stable state and a minimal amount of churn when adding or removing buckets; a full mapping approach that explicitly maps keys to cells; a prefix and range-based mapping approach that maps ranges of keys (or hashes of keys) to cells; a fully-mapped logical bucket approach in which a fixed large number (e.g., tens of thousands) of logical buckets are explicitly mapped to much smaller number of physical cells, and thus mapping a key to a cell is a two-step process in which the key is first mapped to its logical bucket (e.g., using naïve module mapping) and then the cell for that bucket is located using a bucket to cell mapping data structure; using one of these approaches but with a set of mapping "override" functionality to re-map certain resources, etc.

The set of routers 108 of a thin routing layer may also be architected in various ways. For example, this layer may be implemented using a routing load balancer or proxy fleet, and may include request dispatching isolation between cells to prevent a slowdown or other issue in one cell from impacting the ability to dispatch requests to other cells, and may be purposefully designed with little to no "custom" business logic, etc.

An exemplary cell-based service deployment is shown in FIG. 1 at a high level. For the purposes of this description, the resources 110A-110M are volumes or snapshots stored and/or provided by a storage service 120; however, it is to be understood that these particular types of resources are exemplary and many other types of resources can be used in a similar manner in other embodiments. Thus, data content (or resources 110A-110N) for volumes or snapshots of block devices of a cell may be stored in a set of hosts (e.g., server computing devices such as electronic devices 112A-112N) corresponding to the cell. Other cells may be generated based on a determination that the cell is "hot", e.g., by virtue of the cell having a sufficiently large number of associated mutation operations. Various operations involving data content and metadata may be performed in association with the cells using data content and metadata.

Thus, a block device resource may be located in (e.g., assigned to) a first cell 104A of the provider network 100. A snapshot service for the first cell 104A may create, at a time $t_1$, a snapshot of the block device, e.g., in response to receiving a request to generate a snapshot or in response to detection of some other predetermined event (e.g., a period of time has elapsed, a predetermined amount of data content generated for the first block device). Metadata may be included in, or associated with, the snapshot indicating information about the snapshot, which may be part of metadata 116A-116N stored by (or accessible to) a cell manager 114A-114N of a cell, which may be a straightforward service that utilizes a database or other data store to manage and access the metadata 116. The metadata 116 may include, by way of non-limiting example, a block identifier identifying the block device from which the snapshot was captured, a lineage level of the snapshot (e.g., how many snapshots are in a chain of snapshots), identification information corresponding to the cell 104A of the snapshot resource 110A, and/or family details of associated snapshots and/or block devices (e.g., version number, account identifier). The metadata 116 may comprise routing information usable to route data contents of the first block device to and from a set of hosts 112A for storing and retrieving the data content. The routing information may include network location information for the set of hosts 112A (e.g., an IP address, host address, physical location, network address information), memory address information of memory of the set of hosts 112A, and any other appropriate location information. A routing layer (e.g., as partially implemented by the routers 108) of the snapshot service may use the routing information (which may be stored in a routing configuration data store 118) to be able to transfer data contents from the corresponding block device, and/or to other hosts for creating snapshots.

In one embodiment, the block device may be provided to a user of the service provider for use by one or more computer systems of the service provider. For example, the block device may be exposed to virtual computing instances of the service provider such that the instances may use the block device as a local storage device (e.g., a physical disk drive). In one embodiment, a block device may be a logical storage space within (or allocated by) a data storage system in which data objects may be stored in either structured or unstructured (raw) form. The block device may be identified by a volume identifier. Data for the block device may reside in one physical storage device (e.g., a hard disk) or span across multiple storage devices, which may reside on a different system than that of the allocated block device. Data contents of the block device may be modified by the service provider computer systems as a result of data storage operations performed thereon. The block device may itself include several different types of data structures, and the block device may be entirely or only partially structured with such data structures. For example, the block device may be variably manipulated, such as by a client device, to include several data structures in hierarchical form, such as partitions, logical volumes, file systems, directories, and files.

Generally, a "snapshot" may refer to a copy of a portion of a block device taken at a particular point in time, or a copy of the entire block device at a particular point in time. A snapshot may include, or have an association with, incremental data (which may also be referred to as a "change set" or "delta") that includes data that is new or has changed since a previous snapshot was captured. The relationship between a current snapshot, $S_N$, and a previous snapshot, $S_P$, may be represented as $S_N=S_P+\Delta$, where $\Delta$ is a change in data content on the previous snapshot $S_P$—for example, data that is new or has changed in a block device since a previous snapshot was captured. The previous snapshot $S_P$ may be an immediately preceding snapshot (i.e., $S_{N-1}$), or other previous snapshot generated reflecting a state of data content of a block device. Each of the snapshots illustrated may be captured at a different point in time, as described below in further detail.

A management and migration service 122 of the service provider may partition a representation, including the data structures thereof, to optimize cost associated with modifying the relationships and migrating data associated with the data structures. The representation, which itself is an initial cell 104M, may be partitioned into one or more cells 104M, 104N where a given data structure in the representation, such as a block device, is assigned to a new cell and any future data structures generated therefrom are associated with that new cell. As described herein elsewhere, the cells 104M-104N may correspond to a logical grouping of hosts 112M-112N distributed over a plurality of datacenters. As changes to a cell are made over time, computing resource usage may increase in association with modifications to relationships in the representation. For instance, mutation operations (e.g., data storage operations) may be performed to fulfill creation of new snapshots or modifications to existing snapshots initiated to back-up state changes in data content of the block device. These mutation operations, as described below, may have a high cost in terms of computing resources. To optimize resource utilization, the partition service may partition a cell 104M into a set of cells 104M-104N wherein the overall logical representation of the existing data structures remains the same, even after new cells are generated. For instance, the management and migration service 122 may shard the cell 104M by distributing the data contents among a set of physical hosts located in one or more datacenter locations.

The partitioning of the cell 104M may be performed such that "hot" areas of the cell 104M (e.g., data structures having a concentration, or expected concentration based on one or more parameters attributable to the data structure or a related, e.g., predecessor, data structure, of associated mutating operations) are moved into a different cell 104N. As described herein, "hotness" may refer to an observed or predicted concentration of mutation operations, such as capture of a new snapshot or incremental snapshot and/or the generation of a new volume/block device therefrom, associated with a data structure or set of data structures. As may be contemplated, different types of mutation operations may be associated with different amounts of computing resources for performing such operations (e.g., "cost"), and as such, may contribute differently to the overall hotness level. Partitioning may include allocating a new cell 104N separate from the existing cell, associating one or more data structures in the "hot" area of the existing cell with the new cell, and directing the system to assign, to the new cell(s) 104N future data structures related to (e.g., generated from) the reallocated data structures. For instance, in an initial state of the representation, the management and migration service 122 may detect one or more hot areas of the representation corresponding to one or more of the block device(s). Accordingly, the management and migration service 122 may, for one or more of the hot areas, allocate one or more new cells; in this instance, cell 104N. The management and migration service 122 may then migrate and/or reallocate the block device(s) in the existing cell 104M to the new cell 104N, resulting in a second state of the representation. The relationships between data structures represented in the first state are maintained in the second state such that a record is maintained for which data structures in the cell 104M correspond to which data structures in the new cell 104N. Future relationships, such as new snapshot(s) resources, are associated with the respective new cell(s). In some embodiments, the process may repeat with respect to the new cells, as well as what remains of the initial cell.

Memory in the set of host electronic devices 112 may be allocated for storage of data contents for data structures in the cell 104. For example, memory for the cell 104 may be reserved and assigned to the cell 104 for storing data content. The amount of memory may be changed to accommodate a need for data content. Such operations may be performed by an appropriate entity, such as the snapshot service, in response to determining a root node for a cell.

As a result of creation of the snapshot resource (e.g., one of the resources 110), the snapshot service may transfer (e.g., copy) data content from the block device to the set of host electronic devices 112. To capture a state of data content of the block device at the time that the snapshot was initiated, the snapshot service may transfer (e.g., copy), or cause transfer of, data chunks from the block device to the assigned memory of the set of host electronic devices 112. The transfer of the data chunks may take a period of time to complete due to, e.g., network bandwidth limitations. That is, the data chunks may be transferred over a period of time $t_2$ after the time $t_1$. Transferring data chunks over time may represent a significant resource cost for the set of host electronic devices 112. For example, generating an initial snapshot may include transferring the entire data content located, via data chunks in a block device over the time period $t_1$. Creating an incremental snapshot may comprise transferring less than the entire data contents of the block device, but may also comprise obtaining metadata 116 for the block device.

A management and migration service 122 may monitor the resource usage associated with a first cell 104, cell $C_1$, and decide to partition the first cell 104. For instance, the management and migration service 122 may determine that the first cell 104 is 'hot' as a result of ascertaining that the resource cost associated with creating the initial snapshot exceeds a predetermined threshold (e.g., mutation operations for the snapshot generation exceed a predetermined mutation operations threshold). The management and migration service 122 may then create a second cell (e.g., cell 104N), which may include allocation of memory of a second set of host electronic devices 112N for storage of data content of the block device. Although the second cell 104N is created, there may not initially be any data structures assigned to the second cell 104N.

New data structures relating to the block device that are initiated or created at a time $t_3$ after the second cell 104N is created are assigned to the second cell 104N. For instance, a snapshot service 120 may create, or initiate creation of, an incremental snapshot resource, $S_{21}$, of the block device in the second cell 104N in response to, e.g., receiving a user 102 request (e.g., sent via a computing device 104 such as a personal computer, laptop, mobile device, server device, etc.) to generate a snapshot. The incremental snapshot is a data content backup for a state of data content at the time $t_3$ at which the incremental snapshot is created. As a result of creating the incremental snapshot, data chunks of data content of the block device may be transferred for backup to the set of hosts 112N over a period of time $L_1$ after the time $t_3$. The data chunks are data content created on the block device after the time $t_1$, or data content modified on the block device after the time $t_1$. Transfer of the data chunks from the block device to the set of host electronic devices 122N may occur over a period of time $L_1$ after the time $t_3$. The metadata 124 of the incremental snapshot may include different information than the metadata 116 of the initial snapshot. For example, the metadata 124 may indicate location information of data content in the set of host electronic devices 122N corresponding to a state of data content of the block device at the time $t_3$ whereas the metadata 116 may indicate location information of data content in the set of host electronic devices 112 corresponding to a state of data content of the block device at the time $t_1$. In particular, the data content at the time $t_3$ may correspond to the data content that is different in the block device at a time $t_1$ than at the time $t_1$ (e.g., new data content, modified data content). The metadata 124 may also indicate information regarding the metadata 116, such as location information or identification information of the metadata 116. Transfer of the data chunks may be performed in parallel to the transfer of the data chunks such that the time period $t_2$ may, at least in part, overlap with the time period $L_1$.

In an embodiment, as user 102 originated requests to generate a new snapshot of a particular block device are received by a router 108 of a block-level data storage service. The router 108 is a computing device that transmits data from one network to computing devices in another network. Alternatively, the router 108 may be a software application or other application operating on a computing device of the block-level data storage service that replicates the functionality of a hardware-based (e.g., physical) communications network routing device. In some embodiments, the router 108 is a virtualized computing instance, or similar virtualized logical construct, that is instantiated on a computing device of the block-level data storage service or other service to implement the functionality of a hardware-based communications network routing device. The router 108 may maintain or otherwise implement a finite state machine, which may be used to determine the operations that the router 108 is to perform in response to requests from users to create a snapshot of a particular block device, as well as to determine which cell authoritatively maintains data necessary for creating the snapshot. The finite state machine may be a mathematical model of computation, rendered as code executed by a processor or other hardware device implementing the router 108. In an embodiment, the finite state machine transitions into a "started" state in response to the router 108 becoming operational.

Figure 2:
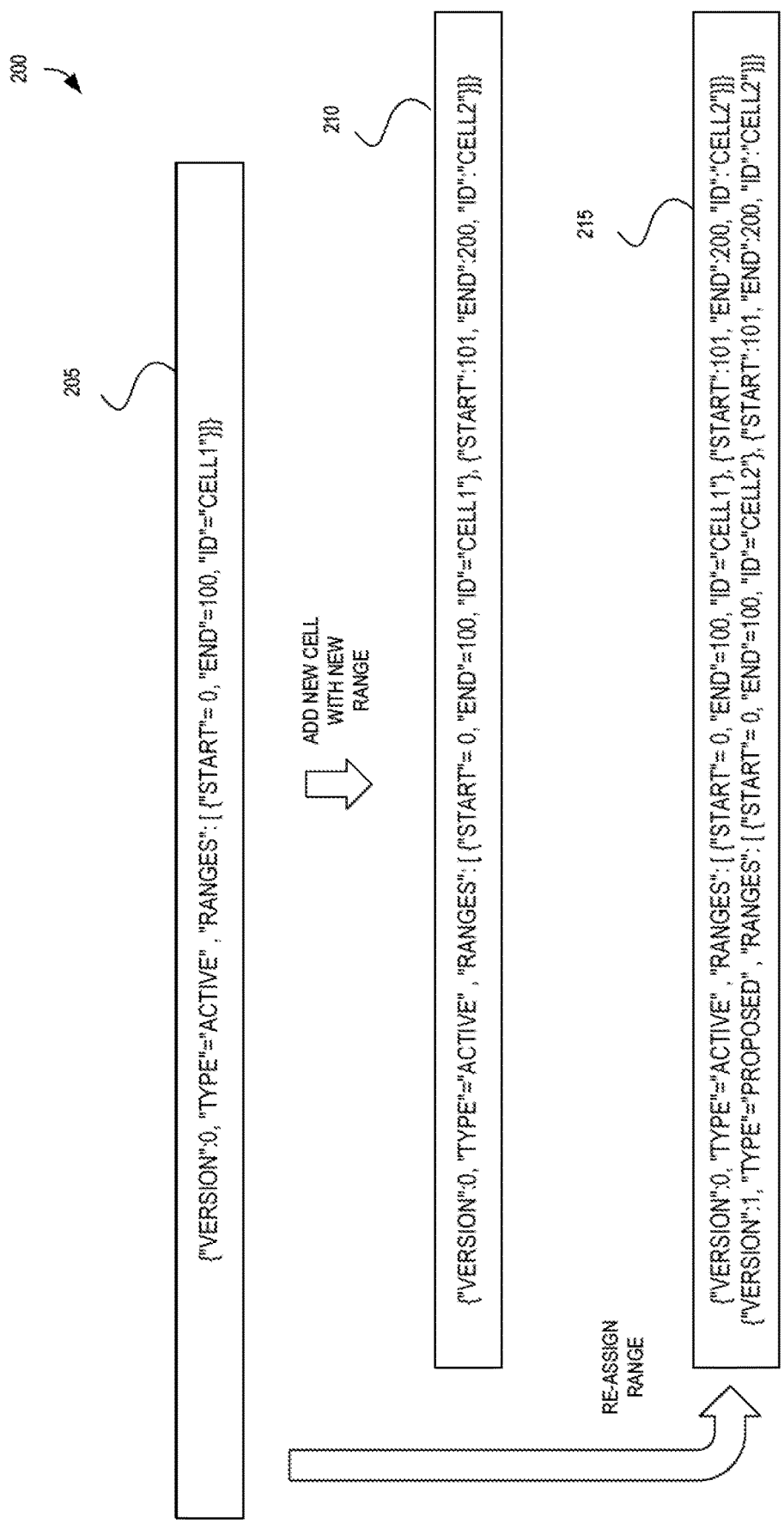
FIG. 2 is a diagram illustrating routing metadata useful for consistent resource visibility during inter-cellular migrations using targeted pairwise scatter-gather techniques according to some embodiments.

The router 108 may perform an asynchronous refresh of the metadata 116 within the cells 104. The router 108 may query each cell 104 to obtain and/or generate routing metadata that specifies information usable by the router 108 to determine how to process requests to use the resources, e.g., to generate snapshots for a block device. FIG. 2 is a diagram illustrating routing metadata 200 useful for consistent resource visibility during inter-cell migrations using targeted pairwise scatter-gather techniques according to some embodiments. As noted here, the routing metadata may be stored in a routing configuration database 118 that is external to but accessible to the router(s) 108, or even internal to the router(s) 108.

In some embodiments, each entry in the routing metadata specifies particular attributes that are used to determine how to route requests to generate a snapshot for a block device. For example, the routing metadata may include a version attribute, which may be a monotonically increasing integer that represents the version of the routing metadata. In an embodiment, the version attribute starts at a value of zero when an initial entry is added to the routing metadata. For example, entries 205 and 210 include a value of "0" for the version attribute, while entries 215 includes an entry with version of "0" and a second entry of version "1."

In some embodiments, an entry in the routing metadata may also include a merit attribute, whereby each value corresponds to a particular metadata type (e.g., active, proposed, or rollback). The merit attribute may be used to determine the path to be used by the router 108 to route a request for creation of a snapshot. In an embodiment, rollback metadata, as described below, may have the lowest merit attribute value while proposed metadata may have the highest merit attribute value.

Each entry in the routing metadata may also include a type attribute. The type attribute may be used by the router 108 to determine the type of metadata included in the particular entry. For example, a type attribute of "active" may correspond to active metadata usable to decide the path for all resources if no alternate metadata in the routing metadata exists. A type attribute of "proposed" may correspond to proposed metadata usable to determine the path for all new resources and may also represent the desired partitioned state if migration of resources from one cell to another cell is successful. For example, if the block-level data storage service identifies one or more "hot" areas within a cell, the block-level data storage service may allocate a new cell separate from the existing cell, and direct the partitioning system to assign, to the new cell, future data structures related to the relocated data structures. If a new cell is created, the partitioning system may generate new metadata having a type attribute of "proposed," which may correspond to locations of data structures within the cells once migration (e.g., relocation) of the data structures has been completed. For example, the second of entries 215 includes a type of "proposed" that indicates a key range of 0-100 (discussed below) is being migrated from a cell "CELL1" to another cell of "CELL2." A type attribute of "rollback" may correspond to rollback metadata usable to determine the path for resources which were placed on new cells based at least in part on proposed metadata but that are to be returned to their original cell. For example, if the block-level data storage service determines that the new cell, during migration, exhibits one or more "hot" areas, the block-level data storage service may cause the partitioning system to transfer any relocation data structures from the new cell to the original cell. The partitioning system may generate new metadata having a type attribute of "rollback," which may specify the locations of data structures within the cells according to the proposed metadata described above. However, these locations may be used by the partitioning system to identify which data structures are to be relocated from the new cell back to the original cell. Thus, in some instances, the locations specified in the proposed metadata and the rollback metadata may be identical.

According to some embodiments, each entry in the routing metadata also includes a range attribute. The range attribute may include a mapping of resource identifiers (e.g., block device identifier hashes) to cell identifiers. In response to a request to generate a snapshot for a particular block device, the router 108 may obtain a hash value corresponding to an identifier of the particular block device and utilize this hash value to determine a cell identifier corresponding to the cell where resources of the block device are located. In an embodiment, the range attribute for proposed metadata and for rollback metadata in the routing metadata 126 is the same. However, the range attribute in the rollback metadata may indicate reverse migration of resources from a new cell to the original cell from which the resources originated. As shown in entry 205, a range of "0-100" is shown as being mapped to a cell "CELL1"—and after a new cell is added, the entry 210 results that includes two ranges: the first range of "0-100" mapped to a cell "CELL1", and a second range of "101-200" mapped to a cell "CELL2."

As shown, despite adding a new range, entry 210 did not have a changed "version" attribute value—in some embodiments, adding a new range to a cell doesn't change the version of the metadata. Instead this operation is considered as an "UnderWrite" (discussed later with regard to the finite state machine), because a range is unique and assigned afresh it doesn't require version change. However, if a range is re-assigned—that is, partitioned off from one cell to a new cell—the metadata version and type changes for the metadata, as reflected by entries 215, where the range "0-100" is reassigned from cell ID "CELL1" to cell ID "CELL2", resulting in a new version identifier of "1" and a new type of "proposed."

Figure 3:
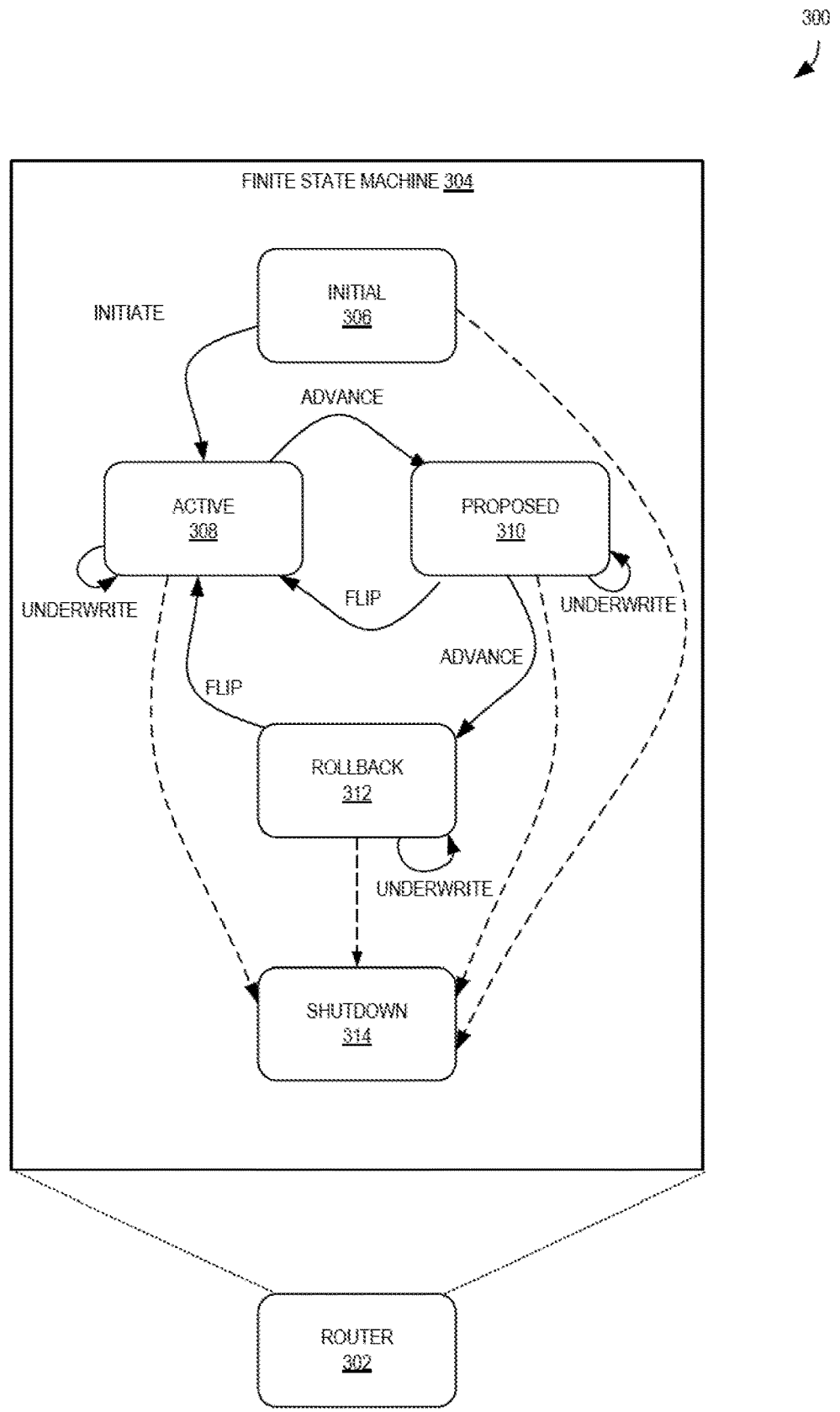
FIG. 3 is a diagram illustrating an example of a system in which a router utilizes a finite state machine to identify actions to be performed for processing of requests for consistent resource visibility during inter-cellular migrations using targeted pairwise scatter-gather techniques according to some embodiments.

Returning to FIG. 1, in some embodiments the router 108 may transmit a request to any cell to obtain the routing metadata. In some embodiments, the router 108 evaluates the routing metadata to determine whether the routing metadata includes active metadata (e.g., an entry having a type attribute of "active"). This can result in the router 108 adjusting or evaluating a finite state machine. FIG. 3 is a diagram illustrating an example of a system in which a router utilizes a finite state machine 304 to identify actions to be performed for processing of requests for consistent resource visibility during inter-cell migrations using targeted pairwise scatter-gather techniques according to some embodiments.

As discussed above, if the routing metadata includes active metadata, the finite state machine advances to the "active" state 308 (e.g., from the initial state 306). The router 108 may use the active metadata to determine where to route requests to create a snapshot of the block device. For instance, the router 108 may use the identifier of the block device to identify the corresponding cell in which a snapshot is to be created. The router 108 may thus submit a request to the identified cell to generate the snapshot. In an embodiment, the request specifies the version attribute value corresponding to the active metadata. In response to the request, the cell determines whether the enforced version for the cell is set to the same value as that specified in the request. If the version attribute values match, the cell processes the request and generates the snapshot within the cell, as specified in the active metadata. If the version attribute values do not match (e.g., partitioning of the cell has begun), the cell may report an exception to the router 108 indicating that the version attribute value provided by the router 108 is now stale (e.g., not valid, expired, etc.).

In an embodiment, if the router 108 receives a stale version exception from the cell, the router 108 causes the finite state machine to advance to the "proposed" state 310. If the finite state machine is in the "proposed" state 310, the router 108 may evaluate active metadata and proposed metadata in the routing metadata to determine which cell to transmit a request to generate a snapshot of a block device. For example, in response to a request to create a snapshot for block device, the router 108 may evaluate the range attributes for the active metadata and the proposed metadata in the routing metadata 126. If the router 108 determines that both the active metadata and the proposed metadata indicate that the resources corresponding to the hash of the block device identifier are in the same cell, the router 108 may transmit the request to the identified cell. This may result in the snapshot being created within the identified cell, as specified in both the active metadata and proposed metadata. However, if the router 108 determines that there is a conflict between the active metadata and the proposed metadata with regard to where the resources corresponding to the hash of the block device identifier are, the router 108 may use the merit attribute values for the active metadata and the proposed metadata to determine where the request should be transmitted. As noted above, proposed metadata may have a higher merit attribute value than the active metadata. Thus, the values specified in the proposed metadata may correspond to a high merit path while the values specified in the active metadata may correspond to a low merit path for path resolution purposes.

If the router 108 determines that multiple paths (e.g., possible cells) exist where the block device and other resources may be located, in some embodiments the router 108 submits a path resolution request for both paths. In an embodiment, the router 108 submits a request to the cell corresponding to the low merit path (e.g., specified in the active metadata) to provide a response with regard to the status of the block device within the cell (e.g., whether the block device is present, whether the block device is in a pre-create migrated state, and/or whether the block device is in the process of being migrated). In an embodiment, for the low merit path, the request from the router 108 indicates that the value corresponding to the pre-create migrated state is to be set to "true" for any new resources created in response to the request (e.g., block device had not been previously created in the cell). Thus, if a cell receives the request from the router 108 and determines that the resource has not been created, the cell may create the resource and designate the resource as being in the pre-create migrated state (e.g., sets a metadata flag corresponding to a pre-create migrated state for the resource to "true"). For the high merit path, the router 108 may submit another request to the cell identified in the high merit path to provide a response with regard to the status of the block device. This request may indicate that the value for the pre-create migrated state is to be set to "false" for any new resources created in response to the request. Thus, if a cell receives this request from the router 108 and determines that the resource has not been created within the cell, the cell may create the resource and designate the resource as not being in the pre-create migrated state (e.g., sets a metadata flag correspond to a pre-create migrated state for the resource to "false").

Turning back to FIG. 1, the response from each cell 104 (e.g., coming from the cell managers 114) may be, for example, a tuple with Boolean values corresponding to whether the resource is present in the cell, whether the resource exists in a pre-create migrated state, and whether the resource is in the process of being migrated. In response to these responses, the router 108 evaluates the responses against a truth table to determine which path to utilize for identifying the location of the block device and, hence, for transmitting the request to generate a snapshot of the block device. The truth table may specify a set of rules corresponding to possible combinations of responses from the cells 104. In an embodiment, the rules specified in the truth table correspond to outcomes that result in preservation of the lineage of snapshots created for the block device over time. For instance, if a cell corresponding to a lower merit value generates a block device in a pre-create migrated state, then, in the event of a catastrophic situation where a higher merit value cell is rendered unavailable, requests to generate a snapshot corresponding to this block device will fail instead of resulting in the creation of corrupt snapshots, thus preserving the lineage of snapshots. The truth table may, thus, specify one or more outcomes that result in the processing of requests to generate snapshots in cells that do not include a block device in a pre-create migrate state, further preserving the lineage of snapshots and preventing creation of corrupt snapshots. Based at least in part on the responses received from the cells 104 the router 108 may identify the applicable rule within the truth table and determine the appropriate path for transmitting the request to generate the snapshot.

In an embodiment, if the block-level data storage system initiates a rollback of resources from a cell (e.g., cell 104N) back to the original source cell (e.g., cell 104M), the block-level data storage system updates metadata for cell to change the version number of the cell. If the router 108 submits a request to the cell to generate a new snapshot 128 and the request specifies a version number corresponding to the version attribute value of the proposed metadata, the cell may return a stale version exception message. If the router 108 receives a stale version exception message from the cell, the finite state machine may advance to the "rollback" state 312 as shown in FIG. 3. As noted above, the routing metadata may specify active metadata, proposed metadata, and rollback metadata. The proposed metadata and rollback metadata may be alternate metadata. The router 108 may evaluate the routing metadata such that only the active metadata and the alternate metadata having the highest version attribute value are used. This causes the router 108 to evaluate the active metadata and the rollback metadata, as the rollback metadata may have a higher version attribute value than the proposed metadata.

The router 108 may use the range attribute values for the active metadata and the rollback metadata to determine which cell is to receive the request to generate the snapshot. As noted above, rollback metadata may have the lowest merit attribute value. Thus, the router 108 may transmit a low merit path request to the cell 104N identified in the rollback metadata to determine the status of the block device within the cell 104N. The router 108 may also transmit a high merit path request to the cell identified in the active metadata to determine the status of the block device within the cell 104. The router 108 may receive responses from each of the cells 104M, 104N and utilize the truth table to determine which cell is to receive the request to generate the snapshot 128 for the block device.

In an embodiment, if migration of the resources of the block level is completed, the block-level data storage service updates the metadata for each associated cell 104 to indicate a new version of the metadata. This new version of the metadata may correspond to new active metadata. The block-level data storage service may also delete any prior proposed metadata and rollback metadata from the routing metadata. Thus, when the router 108 receives this newly updated routing metadata, the router 108 may identify the new active metadata and cause the finite state machine to flip to the "active" state. Requests to generate a snapshot may be evaluated against the new active metadata and routed to the appropriate cell, accordingly.

As indicated herein, an "underwrite" may occur when a new range of resource identifiers is added to a cell, in which case the finite state machine may stay at a same position, as reflected by the loopbacks present at the active state 308, the proposed state 310, and the rollback state 312.

For deeper detail regarding the finite state machine 304 used in some embodiments, in system 300, the router 302 initiates the finite state machine 304 as an initial operation upon activation, e.g., by the block-level data storage service. The finite state machine 304, upon initiation, may enter into an initial 306 state (e.g., "started"). In the initial state 306, the router 302 may query the various cells of the block-level data storage service (e.g., query the cell managers 114A-114N) to obtain routing metadata. In an embodiment, instead of querying each of the various cells for their respective routing metadata, the router 302 obtains consensus routing metadata from a metadata storage (e.g., a routing configuration database 118) of the block-level data storage service. The metadata storage service may comprise one or more computing devices that serve as a data repository for metadata of the block-level data storage service. The metadata storage service may aggregate metadata from the various cells to generate the consensus routing metadata. This consensus routing metadata may specify the current state of the cells of the block-level data storage service.

In an embodiment, the router 302 evaluates the routing metadata (e.g., from the cells or from the metadata routing configuration database and determines whether the routing metadata specifies active metadata. The active metadata may specify the location of block devices and snapshots within the cells and may be used to determine which cell is to receive a request to generate a snapshot of a block device if no alternate metadata (e.g., proposed or rollback metadata) is specified therein. If the router 302 determines that the routing metadata specifies active metadata, the finite state machine 304 advances to the "active" state 308.

In the "active" state 308, the router 302 may use the active metadata specified in the routing metadata to determine how to route requests from users of the block-level data storage service to generate snapshots of block devices or to generate block devices based at least in part on snapshots in the various cells. Requests to cells to generate a snapshot or new block device may specify a version attribute value corresponding to the version attribute value specified in the active metadata. If the version attribute value maintained by the target cell matches the version attribute value specified in the request, the cell may process the request and generate the snapshot or block device accordingly.

In an embodiment, the router 302 continues to query the various cells to obtain additional routing metadata. This additional routing metadata may include alternate metadata, such as proposed metadata and rollback metadata. This additional routing metadata may specify a new version attribute value that is greater than the version attribute value corresponding to the active metadata. However, this additional routing metadata may not be enforced by the router 302 until a request is received to generate a snapshot or block device in a cell that has provided this additional routing metadata. For instance, if the router 302 submits a request to a cell to generate a snapshot or block device within the cell, the cell may return a stale version exception response if the version attribute value maintained by the cell is greater than the version attribute value of the active metadata used by the router 302 to determine where to route the request.

If the router 302 receives a stale version exception response from a cell, the router 302 may transmit a notification to the finite state machine 304 to indicate the value of the stale version (e.g., the version attribute value of the active metadata) and the version attribute value provided by the cell. If the version attribute value provided by the cell matches the version attribute value of proposed metadata in the routing metadata, the finite state machine 304 advances to the "proposed" state 310. If the router 302 receives a request to generate a snapshot of a block device or to generate a new block device based at least in part on an existing snapshot, the router 302 may evaluate the active metadata and the proposed metadata to determine which cell has the requisite resources for fulfillment of the request. For instance, if the active metadata and the proposed metadata both indicate that the same cell has the resources necessary for fulfillment of the request, the router 302 may transmit the request to the cell. However, if the active metadata and the proposed metadata identify different cells that have the resources necessary for fulfillment of the request, the router 302 may perform a conflict resolution process to determine the cell that is to receive the request.

As noted above, proposed metadata may have a higher merit attribute value than active metadata, resulting in the proposed metadata specifying a high merit path for the processing of requests. If the request is to generate new resources, the router 302 may utilize the proposed metadata to determine in which cell these new resources will be generated. However, if the request is to generate a snapshot or a block device using existing resources, the router 302 may transmit a request to each cell specified in the active metadata and the proposed metadata as maintaining these existing resources. If the active metadata and proposed metadata specify that the same cell maintains the set of existing resources, the router 302 may determine that there are no conflicting paths and submit the request to the identified cell.

In an embodiment, in response to a request to generate a snapshot of a block device, the router 302 queries the routing metadata to identify the path for the block device. If the router 302 identifies multiple paths (e.g., more than one cell is identified), the router 302 submits a low merit path request to the cell identified in the active metadata that specifies that if the block device is to be created, it is to be created with a pre-create migrated flag set to a Boolean value of "true." Additionally, the router 302 submits a high merit path request to the cell identified in the proposed metadata that specifies that if the block device is to be created, it is to be created with a pre-create migrated flag set to a Boolean value of "false." Thus, for low merit path cells, requests to generate snapshots may fail instead of resulting in the creation of a corrupt snapshot.

As noted above, creation of a block device in pre-create migrated state in low merit path cells may be performed to prevent creation of corrupt snapshots in the event of a catastrophic event resulting in the unavailability of a high merit path cell. For instance, if a cell corresponding to a lower merit value generates a block device in a pre-create migrated state, then, in the event of a catastrophic situation where a higher merit value cell is rendered unavailable, requests to generate a snapshot corresponding to this block device will fail instead of resulting in the creation of corrupt snapshots, thus preserving the lineage of snapshots.

Each cell that receives either a low merit path request or a high merit path request may return a tuple response. This tuple response may specify a Boolean value for whether the resource is present within the cell, a Boolean value for whether the resource is in a pre-create migrated state, and a Boolean value for whether the resource is in a migrated state (e.g., in the process of being migrated to another cell). In an embodiment, in response to the tuple responses from the cells, the router 302 may evaluate the responses against a truth table to identify the appropriate path to be used to identify the cell that maintains the resources necessary for fulfillment of the request to generate a new snapshot or block device. The truth table may specify one or more outcomes that result in the processing of requests to generate snapshots in cells that do not include a block device in a pre-create migrate state, preserve the lineage of snapshots, and prevent creation of corrupt snapshots. In an embodiment, the truth table specifies, for each possible combination of tuple responses from the cells identified in the identified paths, a path resolution or actions that are to be undertaken by the router 302. For example, for a combination of tuple responses, the truth table may specify which path the router 302 is to utilize to identify which cell is to receive the request to generate a snapshot or block device. Alternatively, for another combination of tuple responses, the truth table may specify that there is no resolution and that there is an error within the system. This may cause the router 302 to return an error message to the requestor. Yet another combination of tuple responses specified in the truth table may result in an indication that the router 302 is to submit the high merit path and low merit path requests again at a later time. Thus, in the "proposed" state 310, the router 302 may submit requests to cells identified in the active metadata and proposed metadata to identify the location of resources necessary for creating a snapshot or block device.

In an embodiment, if migration is completed in accordance with the proposed metadata, the block-level data storage service updates the routing metadata for each cell to indicate the new active state for each cell. The block-level data storage service may delete any alternate metadata from the routing metadata maintained within the cells. The router 302 may obtain this new routing metadata from the cells and, if the new routing metadata does not include any alternate metadata, the router 302 may cause the finite state machine 304 to flip from the "proposed" state to the "active" state 308. Thus, the router 302 may utilize the active metadata from the routing metadata to determine how to route requests to generate snapshots or block devices.

In the event that the block-level data storage service determines that a rollback of resources that were migrated to a new cell is needed, the block-level data storage service may update the routing metadata to include new alternate metadata corresponding to a type attribute value of "rollback." Further, the version attribute value of the rollback metadata may be greater than that of the proposed metadata or active metadata specified in the routing metadata. Thus, if the router 302 submits a request to a cell to generate a snapshot of a block device or to generate a new block device, the router 302 may receive another stale version exception response from the cell. This particular request may specify the version attribute value of the proposed metadata. Thus, if the finite state machine 304 determines that the version attribute value corresponds to rollback metadata, the finite state machine 304 advances from the "proposed" state 310 to the "rollback" state 312.

In the "rollback" state 312, the router 302 may process incoming requests for generating snapshots or block devices using a similar process to that described above in connection with the "proposed" state 310. However, in the "rollback" state 312, the router 302 may ignore the proposed metadata from the routing metadata and utilize the active metadata and the rollback metadata to determine which cell is to receive the request to generate the snapshot or block device. Further, as opposed to proposed metadata, which may have a higher merit attribute value than active metadata, the rollback metadata may have a lower merit attribute value than the active metadata. Thus, the router 302 submits a low merit path request to the cell identified in the rollback metadata that specifies that if the block device is to be created, it is to be created with a pre-create migrated flag set to a Boolean value of "true." Additionally, the router 302 submits a high merit path request to the cell identified in the active metadata that specifies that if the block device is to be created, it is to be created with a pre-create migrated flag set to a Boolean value of "false." Based at least in part on the responses from the cells, and the rules specified in the truth table, the router 302, while in the "rollback" state 312, may determine which cell to route the request for creation of a snapshot or block device.

In an embodiment, if migration is completed in accordance with the rollback metadata, the block-level data storage service updates the routing metadata for each cell to indicate the new active state for each cell. The block-level data storage service may delete any alternate metadata from the routing metadata maintained within the cells. The router 302 may obtain this new routing metadata from the cells and, if the new routing metadata does not include any alternate metadata, the router 302 may cause the finite state machine 304 to flip from the "rollback" state 312 to the "active" state 308.

In some instances, the finite state machine 304 may transition from any state to a "shutdown" state 314. Transition to the "shutdown" state 314 may occur if the router 302 is rendered inoperative by the block-level data storage service or as a result of an event (e.g., power outage, damage to the router 302, etc.). In the "shutdown" state 314, the router 302 may not process requests to generate snapshots or block devices. Further, the finite state machine 304 may remain in the "shutdown" state 314 until the router 302 is reinitialized for use.

With such stateful cell-based architectures, online cell migration may be needed to adjust placement when cells are added or removed. One consideration of online cell migration is handling mapping decisions during the "transitionary" period in which a resource (or group/range) of resources are being migrated from one cell to another. Embodiments may thus utilize cross-cell redirects and/or performing multiple iterations of the mapping algorithm when necessary, against different versions of the mapping algorithm state. Moreover, state itself may be safely migrated in a variety of ways depending on the system, and may include a multiple phase approach in which the data is cloned from its original location into the new location as a non-authoritative copy, the new location's copy is "flipped" to now be "authoritative," a redirection is enabled from the old location to the new location, and the data from the "old" location is forgotten or deleted.

Thus, migration is not an atomic operation, as it's a distributed transaction happening involving at least two cells—i.e., a source cell and a destination cell, along with a separate migration management monitoring/controlling a migration, recovering from failures, etc. In this environment, a resource may potentially be in two places at the same time. This raises an issue in that the visibility of the resource may be affected at times during and/or nearby the migration.

For example, in some embodiments users of a provider network may issue API requests to enumerate resources associated with the user. For example, a user may submit an API request to list identifiers of all snapshots created during a date range, or an API request to determine a number of snapshots have been made involving a given volume, or an API request to identify which snapshots exist that are tagged with a particular value, etc.

Thus, as one example, a user may submit a "describe snapshots" request to describe/identify those snapshots that are available to some user account. The snapshots available may include "public" snapshots (generally available to many users of the provider network), private snapshots owned by the requesting user, and/or "private" snapshots owned by other user accounts of the provider network that were shared with the calling user. Accordingly, these different snapshots may be located in potentially multiple different cells—e.g., one or more for private snapshots owned by the requesting user, one or more for public snapshots, one or more for one or more other private but shared snapshots. Such a describe snapshots request may include parameters such as a set of snapshot identifiers of interest, a set of snapshot owners of interest, a list of users, etc., that may form the one or more criteria upon which resources are to be identified.

In some embodiments, a describe snapshots request may allow pagination. If a user is describing a long list of snapshots, the user can paginate the output to make the list more manageable. For example, a "MaxResults" parameter could be used to set the maximum number of results returned in a single page. If the list of results exceeds a provided MaxResults value, then that number of results is returned along with a "NextToken" value that can be passed to in a subsequent describe snapshots request to retrieve the remaining results.

Due to the distributed nature of such systems and the need to scale, it may be infeasible to track all of this information in a single centralized data store; instead, such systems typically perform a number of real-time queries to a number of different entities to identify the results. For example, in some embodiments a router may determine that resources associated with a user could be (or are) located in potentially two different cells and send queries to those two different cells to obtain the requested information.

However, under such an approach, these queries may be received and processed at different times, leading to various inconsistencies. For example, a first resource may be migrated from a first cell to a second cell. At a point prior to the migration, a user's first describe snapshots request may be received that is serviced by querying the first cell for resource identifiers, which may include an identifier of the first resource. During or after the migration, a user's subsequent describe snapshots request (e.g., in the pagination usage scenario) may be received that is serviced via querying the second cell for resource identifiers, which again may include an identifier of the first resource due to it having been migrated. As a result, the user could be provided duplicate results—e.g., two versions of the first resource identifier returned, and possibly indicators that the first resource is located in two different locations (in embodiments in which the cell location is exposed to users).

As another example, a query issued by the router to the target cell prior to the migration beginning would not return the resource, whereas a query issued to the source cell that is serviced by the source cell during the migration (or after the migration) may similarly report that the resource is not located there.

Accordingly, embodiments utilize a selective pairwise scatter-gather technique to eliminate such inconsistencies where a resource could potentially be duplicated in results, or potentially not shown at all despite its existence. In some embodiments, when migration is happening from a source cell to a target cell, the source and target cells are considered a pair for the purposes of servicing paginated requests. Thus, if a cell not involved in the migration is queried, its results (e.g., resource identifiers) may be returned to the router and ultimately provided to the requesting user. However, if a cell involved in the migration needs to be queried, the router may perform a pairwise scatter-gather by issuing a same query to both the source and target cells, obtaining responses from both the source and target cells, and eliminating duplicate resource identifiers—i.e., generate a union of the set of resources identified by the source cell and the set of resources identified by the target cell. For example, if one or more describe resource (e.g., describe snapshot) paginated requests are received, and the router determines that potentially four cells need to be queried (e.g., A, B, C, D), and further determines that a migration exists between some resources involving cells B and C, the router may independently query cell A or D for its results and return them, and may treat cells B and C as a pair by issuing a same query to each in a scatter-gather approach, receive the dual results, and aggregate these results by constructing a union of the two sets that removes redundant values.

With reference to FIG. 1, as shown at circle (1) the management and migration service 122 may determine that resources of a first cell 104M (e.g., part of a key space) are to be migrated into another cell 104N (based on "hotness" or another metric, for example) and may initiate the migration at circle (2), causing the updating of the resource metadata 116M-116N as shown at circles (3A) and (3B), e.g., to identify the in-progress nature of the migration.

At circle (4), a computing device 104 may issue a paginated describe API request specifying some set of resources to be described. The API request may be a HyperText Transfer Protocol (HTTP) request message destined to an endpoint associated with the provider network 100 that is thereafter sent to a router 108. For the purpose of this example, this paginated describe API request is a "first" such paginated request for a set of resources.

Upon receipt, at circle (5), the router 108 may identify the user account that submitted the request using techniques known to those of skill in the art (e.g., identifying a customer identifier included in the request, or based on data included in the request). In some embodiments, the router 108 may then identify cells that do (or could) include resources associated with the customer that are to be queried—e.g., a first cell 104A, a second cell 104M, and a third cell 104N, which may be based on use of a mapping algorithm, the routing configuration database 118, etc.

The router 108 may identify, for example based on the routing metadata, whether any of these potential resources may be in migration. In some embodiments, an individual resource or range of resources may be designated with a resource state. A resource state may include, for example, one or more of "native" (used only in cells where a resource was created, indicating that the resource was in fact created within the cell), "local authority" (used in target cells, indicating that a resource was created in another cell, but that the current cell is authoritative for the resource), "pending migration" (indicating that a migration has been initiated but not yet completed), "migration completed" (used in source cells, indicating that the migration workflow has been completed, optionally with a timestamp to indicate when migration was completed), etc. Thus, the router 108 may use this information to determine whether a resource for a cell is in migration, and if so, determine pairs of cells involved in such a migration (e.g., that the second cell 104M and third cell 104N are a pair due to a migration of a resource out of the second cell 104M and into the third cell 104N).

In this scenario, according to a deterministic exploration algorithm, the router 108 chooses to first query the first cell 104A for resource information by sending a "describe" type query (or, "describe all" query), which is looked up by the cell manager 114A (e.g., using metadata 116A) and returned from the cell manager 114A to the router 108. This resource information (e.g., a set of resource identifiers and/or other resource associated information) may be returned back to the computing devices 104.

In some embodiments, the router 108 also returns a "NextToken" token value that can be passed to in a subsequent describe snapshots request to retrieve the remaining results. This token may be generated in a variety of ways and may be intelligently formulated to allow the router 108 to determine, based on a value of that token, at what stage of the cell querying the router 108 is at for a set of pagination requests (e.g., which cell or cells are remaining to be queried, which resources of a cell have been already reported, and the like). The token value may be generated by the cell or cells and returned by the router in their raw form or in a modified form, or in other embodiments may be generated by the router itself, as described further below.

Thus, as reflected by the dashed lines adjacent to circles (4) and (5), it may be the case that one or more subsequent paginated describe requests are sent that require further use of results from the first cell 104A, which may have been cached by the router 108 or may require additional queries to be issued to the first cell. For example, if a first pagination request has a "maximum results" parameter of "50" and the first cell has one-hundred and thirty results, three different consecutive paginated describe requests may utilize results from the first cell. This procedure may continue for other cells that are not under migration in a similar manner.

At some point, as reflected by circle (6), another paginated describe request may be issued that causes the router 108 to need to query a cell that is under migration—here, cell 104M. Due to determining that this cell is a source cell 104M along with a paired target cell 104N, at circle (7) the router 108 may now send a same query (via a pairwise scatter-gather technique) to both cells 104M-104N, and each cell may send a response thereto back to the router 108. The router 108 may then aggregate these results based on performing a union of the two sets of resource information, so that if any duplicate entries exist (e.g., one being provided back by each cell that relates to a same resource) they can be consolidated into just one entry, which again may be returned to the computing device 104. The selection between which record to include, when records corresponding to a same resource are provided by multiple cells, may be made according to an aggregation policy. For example, an aggregation policy may be configured such that the record to be chosen is a most recently updated version, e.g., by identifying a most recently one based on its version vector, etc.

In some embodiments, such as when each cell sends back a number of records that collectively are larger than a requested number of records sought by the client, the router may select up to that threshold number of records to be returned; thus, the results provided to the client may not be a "true" union of the records provided by the cells. For example, if each of two cells returns fifty resources when the total requested number of records is only fifty, the router may aggregate these resources by, e.g., selecting only fifty resources.

In some embodiments, each response from a cell may include a cell-generated page token, and the router may create a new page token based on these tokens (e.g., by concatenating the entire tokens or portions thereof, etc.) that the router may send back to the client. When such a token is passed back in a subsequent request from the client, the router may thus analyze it to identify the involved cells and/or the progress of the describing/exploration of the resources.

In this manner, cells not involved with resource migrations may be queried independently while migration-affected cells are queried using a pairwise scatter-gather approach to effectively prevent inadvertent resource duplications.

Figure 4:
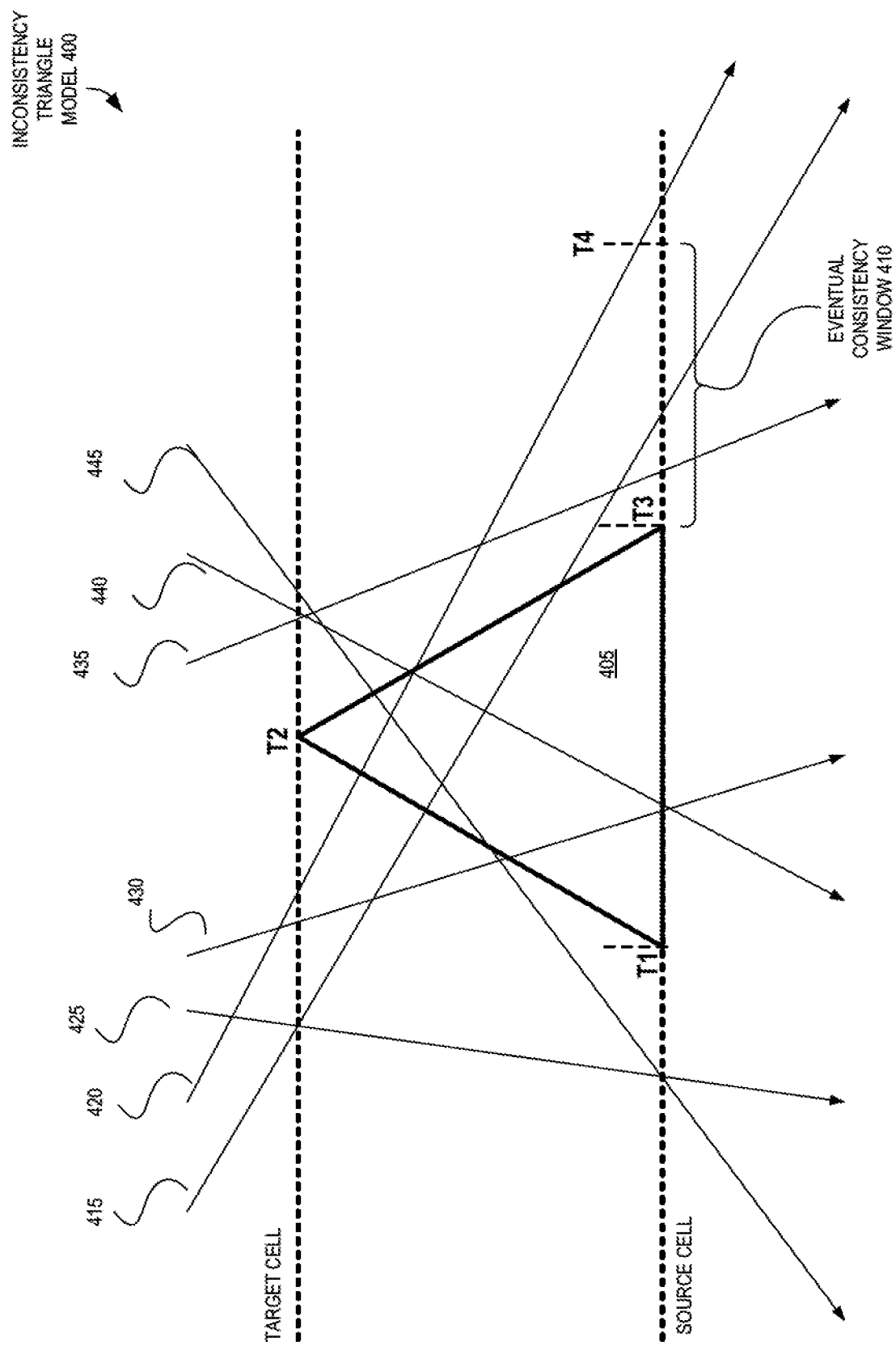
FIG. 4 is a diagram illustrating an inconsistency triangle model useful for consistent resource visibility during inter-cellular migrations using targeted pairwise scatter-gather techniques according to some embodiments.

For further detail on selective pairwise scatter-gather querying, FIG. 4 is a diagram illustrating an inconsistency triangle model 400 useful for consistent resource visibility during inter-cellular migrations using targeted pairwise scatter-gather techniques according to some embodiments. During migration of a record from a 'source' cell to a 'target' cell, with a system following a two-phase commit protocol, the migration transactions can be modeled as a triangle as reflected in FIG. 4. This model 400 helps illustrate and identify the behavior for scatter-gather requests to provide 'eventually consistent' responses.

In this model, the record to be migrated contains following additional attributes: "migrationFlag" that can be pending, migrated, or empty; and "migrationTime" that can be set when a record is migrated away from the source, i.e., confirmed to be actively placed in the target.

All depicted times follow an ordering such that the left side of the figure is a time physically earlier than time moving right, and thus, physical times $T1<T2<T3<T4$. In some embodiments, a migration transaction may proceed as follows: (1) update the metadata record in the 'source' cell to be marked as 'migrationFlag': 'pending' at an initial time T1, (2) place the record in the 'target' cell at time T2, (3) mark the record in the 'source' cell as 'migrationFlag': 'migrated' and 'migratonTime: T3' at time T3, and (4) allow the 'migrated' record to be visible until time T4, where $T4=T3+$an "eventual consistency window" period of time, which is a time delta beyond the migrated time to allow inflight requests to achieve eventual consistency on scatter-gather requests.

The model 400 can identify scenarios where a scatter-gather request sent to two cells can be received in various orders with respect to physical time and the record/resource being migrated.

For example, line 440 represents a scenario such that the scatter request was received by the source cell after the record was marked 'pending' and the request was received by 'target' after the record was actually placed there. In this case, the routing layer will get the response from both cells as including the resource. In some embodiments, the router will decide which record to present based on API semantics.

Line 435 represents a scenario such that a request on the source cell was received after record migration was complete and the request was received at the target cell after the record was placed there. Because the 'migrationTime' on the source falls within the eventual consistency window 410, the source cell will return the record and the router will get the response from both locations. The routing later can decide which record to present as the response based on API semantics.

In contrast, line 420 represents a scenario such that the request is received at the source cell after the eventual consistency window 410 (and thus, the record is gone/forgotten) and the request was received at the target cell before the record was placed there. In this case, the router will not get a positive response from either cell. Based on the API semantics and implementation choices, in some embodiments such a source cell could fail the request (e.g., send back an error/failure status code) when the request was received after the eventual consistency window 410 amount of time—e.g., a specific error code such as 'InvalidRequestPostMigration.' In such embodiments, this type of error code specialization can help routers plan a retry strategy (e.g., again query the target cell) instead of failing the request immediately.

Line 445 represents a scenario such that the request is received at the source cell before the record is marked for migration, and the request was received at the target cell after the record was put in the target location. In this case, the router will get the record from both cells, and would need to decide which version of the record to return as the ultimate response based on the API semantics.

Likewise, lines 415, 425, and 430 will also lead to the record being returned from the source cell but not the target cell, as migration has not started from the target cell's perspective, and from the source cell's perspective the request was received within the eventual consistency window 410, before migration even started, and in the midst of the migration, respectively.

As described herein, it is important to select a proper eventual consistency window 410 threshold to ensure for proper consistency in all scenarios. The decision to pick the eventual consistency window size relies on the API semantics, how large a "page" could be, how skewed the system clocks could be, etc. —thus, the factor should be set sufficiently large to handle the API timeout at the upstream layer.

Figure 5:
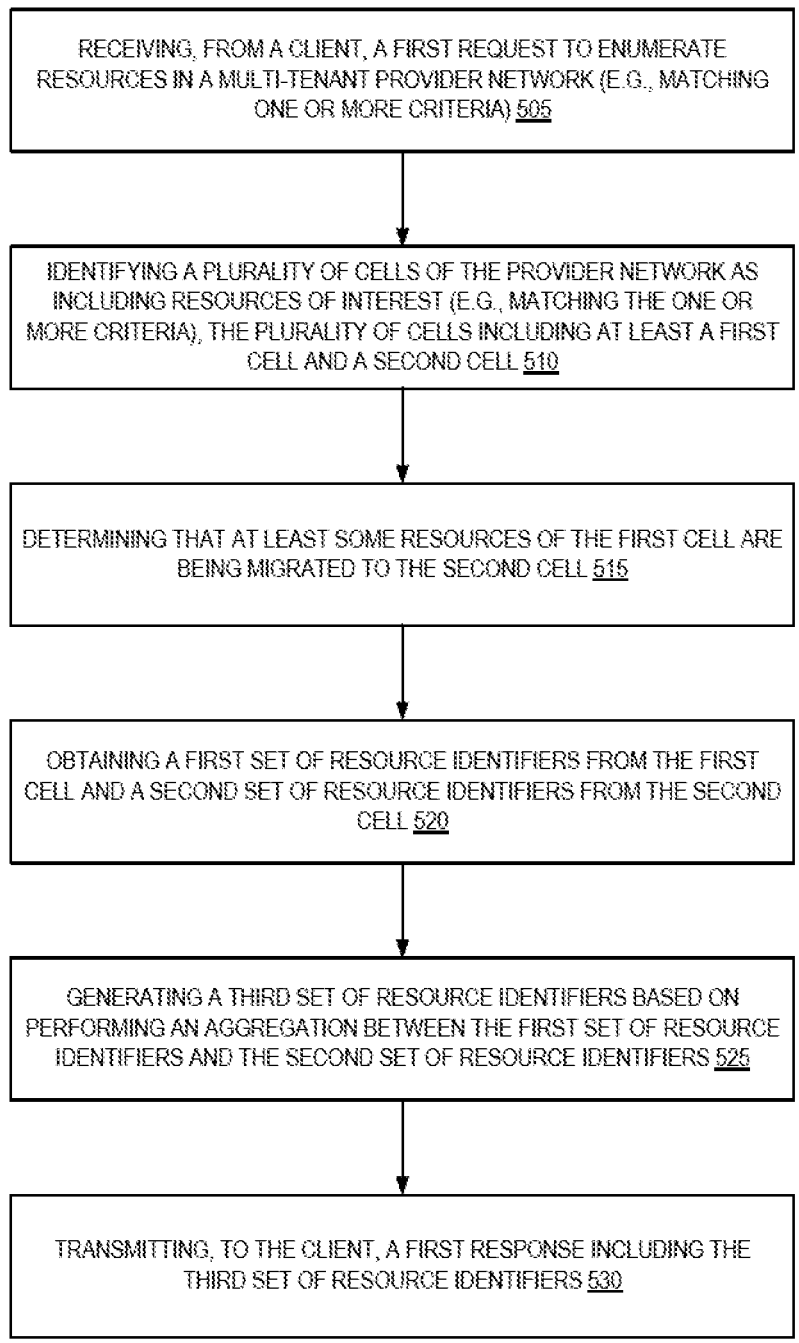
FIG. 5 is a flow diagram illustrating operations of a method for consistent resource visibility during inter-cellular migrations using targeted pairwise scatter-gather techniques according to some embodiments.

FIG. 5 is a flow diagram illustrating operations 500 of a method for consistent resource visibility during inter-cellular migrations using targeted pairwise scatter-gather techniques according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the router(s) 108 of the other figures.

The operations 500 include, at block 505, receiving, from a client, a first request to enumerate resources in a multi-tenant provider network that match one or more criteria. The first request may be received at an endpoint of the multi-tenant provider network, and the client may be an application executed by a computing device of a user of the provider network. The first request may be a "describe" type request seeking a list of resources associated with the user's account, such as a list of volumes, snapshots, instances, files, etc., and thus the criteria may be based on a user account identifier. In some embodiments, the request to enumerate resources comprises a request to describe snapshots or volumes available to a user of the provider network, and thus the criteria may be based on a type of resource. In some embodiments, the request was originated by a computing device outside of the provider network; and the request comprises an HTTP request that is received at an endpoint of the provider network. In some embodiments, the first request to enumerate resources indicates that a maximum threshold number of results are to be returned responsive to the request.

At block 510, the operations 500 include identifying a plurality of cells of the provider network as including resources of interest that match the one or more criteria, the plurality of cells including at least a first cell and a second cell. Block 510 may include identifying an account associated with the first request, and identifying, based on an identifier of that account, one or more cells as being designated as hosting resources for the account. Block 510 may also include identifying one or more other cells having resources shared with that account, or cells having resources shared generally with many/all accounts of the provider network. Each of the plurality of cells may correspond to a logical grouping of a plurality of host computing devices of the provider network.

The operations 500 include, at block 515, determining that at least some resources of the first cell are being migrated to the second cell. Block 515 may include performing a lookup in a data structure associated with the cells to identify whether any entries exist indicating that a migration has been started—e.g., a migration of a keyspace is in a "pending" or "proposed" state.

At block 520, the operations 500 include obtaining a first set of resource identifiers from the first cell and a second set of resource identifiers from the second cell. In some embodiments, block 520 includes sending a describe query to the first cell; receiving a first describe query response from the first cell that includes one or more records corresponding to the first set of resource identifiers; sending the describe query to the second cell; and receiving a second describe query response from the second cell that includes one or more records corresponding to the second set of resource identifiers.

The describe query, in some embodiments, was received at the first cell after the migration had been completed; the migration included moving a first resource from the first cell to the second cell; and a first resource identifier corresponding to the first resource was not included in the first set of resource identifiers sent by the first cell due to a configured consistency window of time after the end of the migration having elapsed.

In some embodiments, block 520 includes sending a describe query to the first cell, wherein the first cell is a source cell of the migration, and wherein the describe query is received at the first cell after the migration has completed but before a consistency window amount of time has elapsed; and receiving a first describe query response from the first cell that includes one or more records corresponding to the first set of resource identifiers, wherein the first set of resource identifiers includes an identifier of at least one resource that has been migrated away from the first cell to the second cell due to the consistency window amount of time not having elapsed.

The operations 500 include, at block 525, generating a third set of resource identifiers based on performing an aggregation between the first set of resource identifiers and the second set of resource identifiers. Block 525 may include performing an aggregation process including removing duplicate entries from the first set of resource identifiers and the second set of resource identifiers so that only a single record remains for a particular resource. The aggregation process may use a policy to determine which of potentially two records associated with a same resource is to be used in the third set of resource identifiers At block 530, the operations 500 include transmitting, to the client, a first response including the third set of resource identifiers.

In some embodiments, the identified plurality of cells further includes a third cell; and the operations further include: receiving, from the client, a second request to enumerate resources; sending a query to the third cell; receiving a query response from the third cell including a fourth set of resource identifiers; and transmitting, to the client, the fourth set of resource identifiers. In some embodiments, the first response includes a page token; and the second request includes the page token from the first response.

In some embodiments, the first set of resource identifiers from the first cell includes a first resource identifier; the second set of resource identifiers from the second cell includes the first resource identifier; and the third set of resource identifiers includes a single entry for the first resource identifier.

Figure 6:
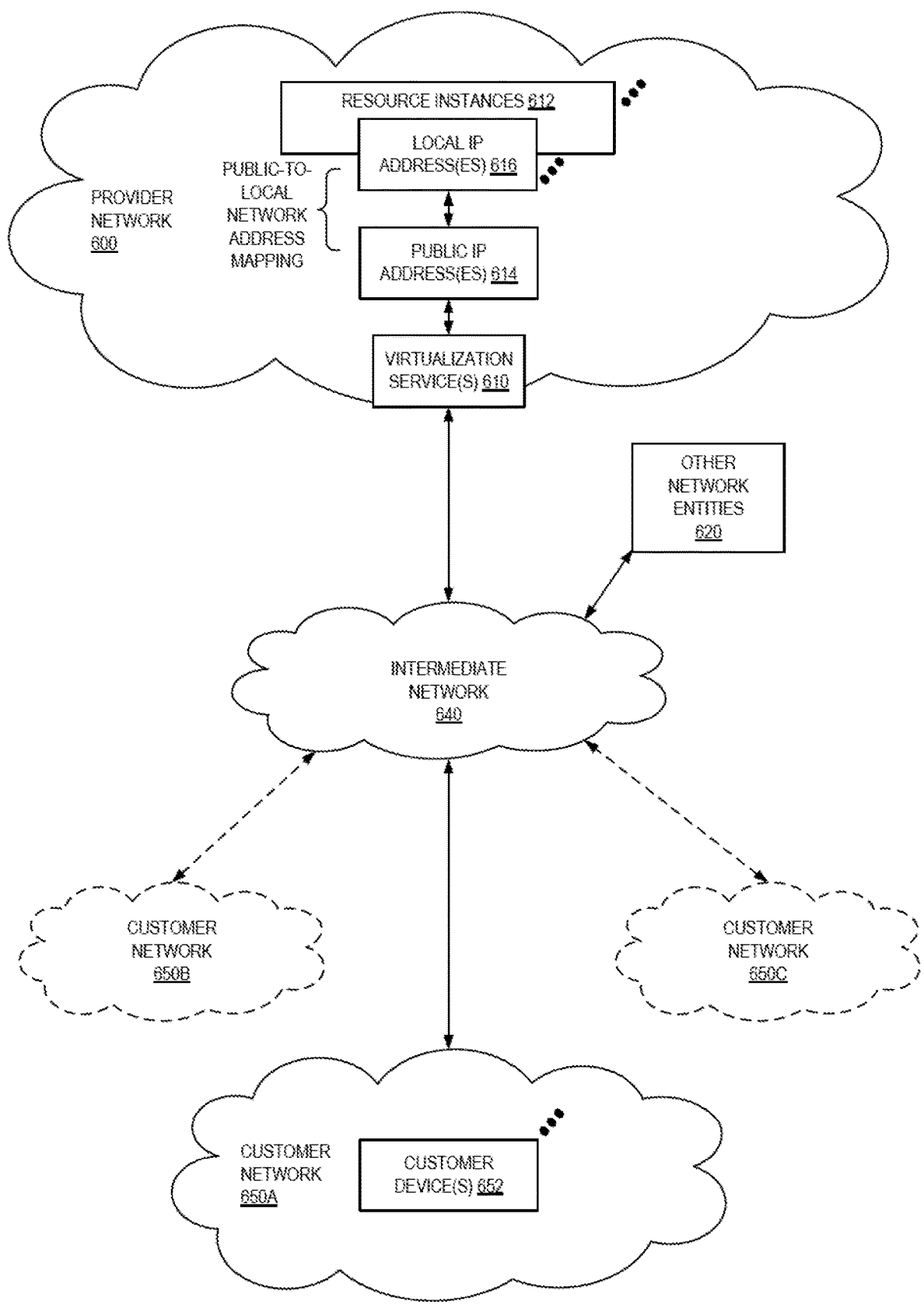
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
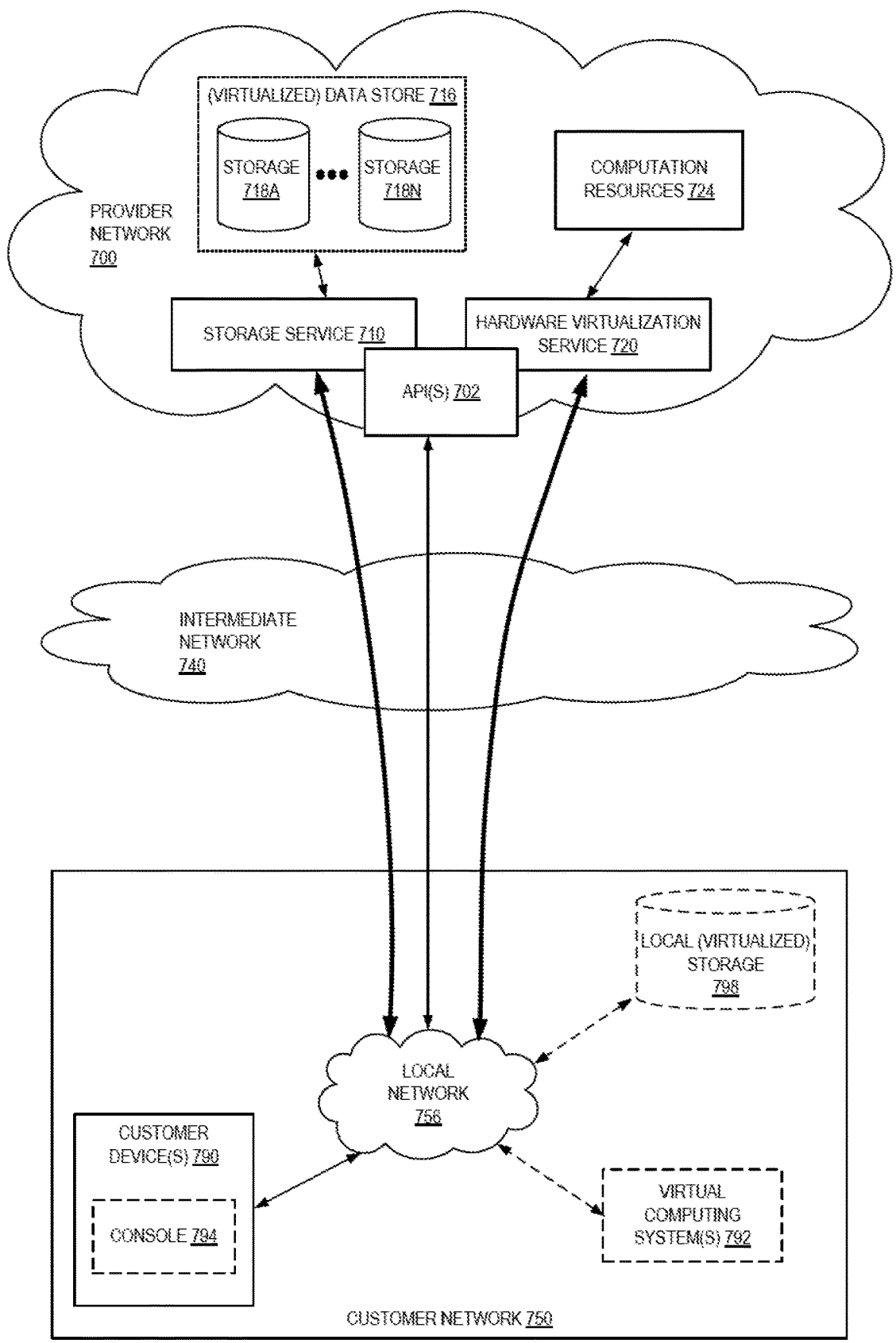
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
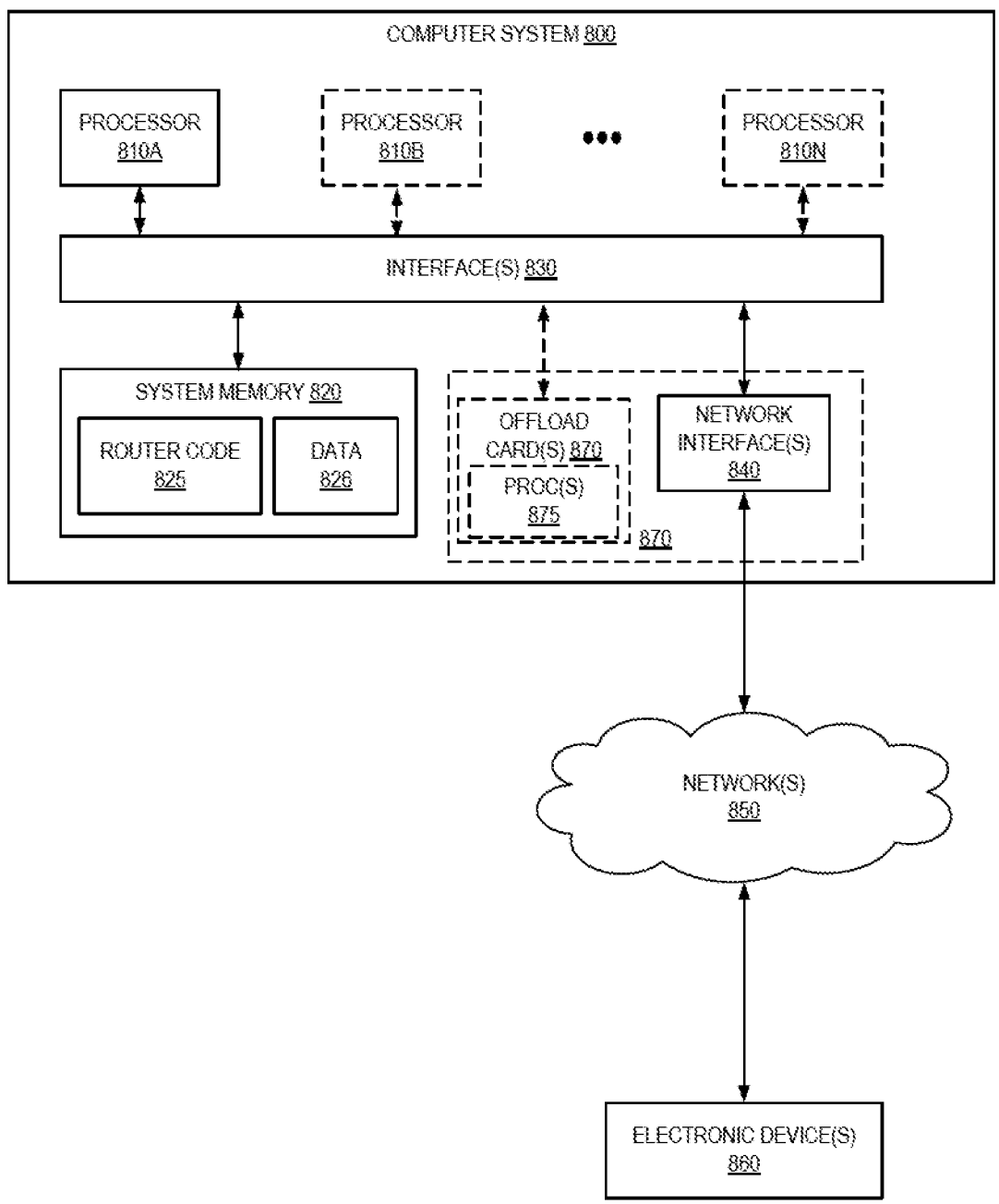
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as router code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, from a client, a first request to enumerate resources in a multi-tenant provider network that match one or more criteria;
    identifying a plurality of cells of the provider network as including resources of interest that match the one or more criteria, the plurality of cells including at least a first cell, a second cell, and a third cell, and wherein each of the plurality of cells corresponds to a logical grouping of a plurality of host computing devices;
    obtaining, from the first cell, a first set of resource identifiers associated with the first cell, the obtaining comprising sending a first query to the first cell and receiving a first query response including the first set of resource identifiers;
    transmitting, to the client, a first response including the first set of resource identifiers;
    receiving, from the client, a second resource enumeration request to enumerate resources in the provider network that match the one or more criteria;
    determining that at least some resources located within the second cell are being migrated to the third cell;
    obtaining a second set of resource identifiers from the second cell and a third set of resource identifiers from the third cell, the obtaining including sending a second query to both the second cell and the third cell, and receiving a second query response from the second cell including the second set of resource identifiers and a third query response from the third cell including the third set of resource identifiers;
    generating a fourth set of resource identifiers based on performing an aggregation between the second set of resource identifiers and the third set of resource identifiers; and
    transmitting, to the client, a second response including the fourth set of resource identifiers.

2. The computer-implemented method of claim 1, wherein:
    the first request indicates that a maximum number of resources are to be returned in a response;
    the first response includes a first page token;
    the second request includes the first page token from the first response; and
    the second response includes a second page token generated based at least in part on a third token obtained from the second cell and a fourth token obtained from the third cell.

3. The computer-implemented method of claim 1, wherein:
    the second set of resource identifiers from the second cell includes a first resource identifier;
    the third set of resource identifiers from the third cell also includes the first resource identifier; and
    the fourth set of resource identifiers includes a single entry for the first resource identifier.

4. A computer-implemented method comprising:
    receiving, from a client, a first request to enumerate resources in a multi-tenant provider network matching one or more criteria;
    identifying a plurality of cells of the provider network as including resources that match the one or more criteria, the plurality of cells including at least a first cell and a second cell,
    determining that at least some resources of the first cell are being migrated to the second cell;
    obtaining a first set of resource identifiers from the first cell and a second set of resource identifiers from the second cell;
    generating a third set of resource identifiers based on performing an aggregation between the first set of resource identifiers and the second set of resource identifiers; and
    transmitting, to the client, a first response including the third set of resource identifiers.

5. The computer-implemented method of claim 4, wherein:
    the identified plurality of cells further includes a third cell; and the method further comprises:
    receiving, from the client, a second request to enumerate resources; sending a query to the third cell;
    receiving a query response from the third cell including a fourth set of resource identifiers; and
    transmitting, to the client, the fourth set of resource identifiers.

6. The computer-implemented method of claim 5, wherein:
    the first request to enumerate resources indicates that a maximum threshold number of results are to be returned responsive to the first request.

7. The computer-implemented method of claim 5, wherein:
the first response includes a page token; and
the second request includes the page token from the first response.

8. The computer-implemented method of claim 4, wherein obtaining the first set of resource identifiers from the first cell and the second set of resource identifiers from the second cell comprises:
sending a describe query to the first cell;
receiving a first describe query response from the first cell that includes one or more records corresponding to the first set of resource identifiers; sending the describe query to the second cell; and
receiving a second describe query response from the second cell that includes one or more records corresponding to the second set of resource identifiers.

9. The computer-implemented method of claim 8, wherein:
the describe query was received at the first cell after the migration had been completed;
the migration included moving a first resource from the first cell to the second cell; and
a first resource identifier corresponding to the first resource was not included in the first set of resource identifiers sent by the first cell due to a configured consistency window of time after the end of the migration having elapsed.

10. The computer-implemented method of claim 4, wherein:
the first set of resource identifiers from the first cell includes a first resource identifier;
the second set of resource identifiers from the second cell includes the first resource identifier; and
the third set of resource identifiers includes a single entry tar the first resource identifier.

11. The computer-implemented method of claim 4, wherein each of the plurality of cells corresponds to a logical grouping of a plurality of host computing devices of the provider network.

12. The computer-implemented method of claim 4, wherein the first request to enumerate resources comprises a request to describe snapshots or volumes available to a user of the provider network.

13. The computer-implemented method of claim 4, wherein:
the first request was originated by a computing device outside of the provider network; and
the first request comprises a HyperText Transfer Protocol (HTTP) request that is received at an endpoint of the provider network.

14. The computer-implemented method of claim 4, wherein obtaining the first set of resource identifiers from the first cell and the second set of resource identifiers from the second cell comprises:
sending a describe query to the first cell, wherein the first cell is a source cell of the migration, and wherein the describe query is received at the first cell after the migration has completed but before a consistency window amount of time has elapsed; and
receiving a first describe query response from the first cell that includes one or more records corresponding to the first set of resource identifiers, wherein the first set of resource identifiers includes an identifier of at least one resource that has been migrated away from the first cell to the second cell due to the consistency window amount of time not having elapsed.

15. A system comprising:
a first one or more electronic devices to implement a first cell of a service in a multi-tenant provider network;
a second one or more electronic devices to implement a second cell of the service in the multi-tenant provider network;
a third one or more electronic devices to implement a routing layer of the service, the routing layer including instructions that upon execution cause the routing layer to: receive a first request to enumerate resources in the multi-tenant provider network matching one or more criteria;
identify a plurality of cells of the provider network as including resources of interest that match the one or more criteria, the plurality of cells including at least the first cell and the second cell;
determine that at least some resources of the first cell are being migrated to the second cell;
obtain a first set of resource identifiers from the first cell and a second set of resource identifiers from the second cell;
generate a third set of resource identifiers based on performing an aggregation between the first set of resource identifiers and the second set of resource identifiers; and
transmit a first response including the third set of resource identifiers.

16. The system of claim 15, wherein:
the system further comprises a fourth one or more electronic devices to implement a third cell of the service in the multi-tenant provider network;
the instructions upon execution further cause the routing layer to: receive a second request to enumerate resources; send a query to the third cell;
receive a query response from the third cell including a fourth set of resource identifiers; and
transmit the fourth set of resource identifiers.

17. The system of claim 16, wherein:
the first request to enumerate resources indicates that a maximum threshold number of results are to be returned responsive to the first request.

18. The system of claim 16, wherein:
the first response includes a page token; and
the second request includes the page token from the first response.

19. The system of claim 15, wherein the instructions upon execution further cause the routing layer to:
obtain a first page token generated by the first cell; obtain a second page token generated by the second cell; and
generate a third page token based at least in part on the first page token and the second page token,
wherein the first response includes the third page token.

20. The system of claim 15, wherein:
the first request was originated by a computing device outside of the provider network; and
the first request comprises a HyperText Transfer Protocol (HTTP) request that is received at an endpoint of the provider network.

* * * * *